United States Patent [19]
Becker et al.

[11] Patent Number: 6,095,555
[45] Date of Patent: Aug. 1, 2000

[54] APPARATUS FOR SENSING A FORWARD POSITION OF A VEHICLE SEAT

[75] Inventors: David L. Becker, White Lake; Laverne R. Newman, Southfield, both of Mich.

[73] Assignee: TRW Inc., Lyndhurst, Ohio

[21] Appl. No.: 09/310,809

[22] Filed: May 12, 1999

[51] Int. Cl.[7] .................................................. B60R 21/26
[52] U.S. Cl. ........................................................... 280/735
[58] Field of Search ............................................ 280/735

[56] References Cited

U.S. PATENT DOCUMENTS

| | | | |
|---|---|---|---|
| 2,927,627 | 3/1960 | Lohr | 155/14 |
| 2,982,335 | 5/1961 | Garvey | 155/14 |
| 2,983,545 | 5/1961 | Garvey et al. | 296/65 |
| 3,059,960 | 10/1962 | Komorowski et al. | 296/65 |
| 3,183,314 | 5/1965 | Pickles | 200/1 |
| 4,204,255 | 5/1980 | Cremer | 364/425 |
| 4,853,629 | 8/1989 | Rops | 324/208 |
| 4,909,560 | 3/1990 | Ginn | 296/65.1 |
| 4,970,463 | 11/1990 | Wolf et al. | 324/207.2 |
| 5,029,304 | 7/1991 | Tolmie, Jr. | 341/15 |
| 5,469,054 | 11/1995 | Bicking | 324/207.2 |
| 5,493,216 | 2/1996 | Asa | 324/207.2 |
| 5,531,472 | 7/1996 | Semchena et al. | 280/735 |
| 5,542,493 | 8/1996 | Jacobson et al. | 180/272 |
| 5,606,255 | 2/1997 | Shimbo et al. | 324/207.2 |
| 5,608,317 | 3/1997 | Hollmann | 324/207.2 |
| 5,707,076 | 1/1998 | Takahashi | 280/735 |
| 5,803,491 | 9/1998 | Barnes et al. | 280/735 |
| 5,804,887 | 9/1998 | Holzapfel et al. | 280/735 |
| 5,893,582 | 4/1999 | Allen et al. | 280/735 |

*Primary Examiner*—Kenneth R. Rice
*Attorney, Agent, or Firm*—Tarolli, Sundheim, Covell, Tummino & Szabo L.L.P.

[57] ABSTRACT

An apparatus (10) for sensing a forward position of a vehicle seat (12) in a vehicle includes a permanent magnet (72) that is located adjacent the forward position and produces a magnetic field. A Hall effect device (70) is disposed in the magnetic field. A first member is mountable to the vehicle seat (12) and is movable with the seat in a path that extends adjacent the magnetic field to a predetermined forward position adjacent the Hall effect device (70) and the magnet (72). The first member is made of a ferromagnetic material. The magnet (72) creates a magnetic field of a first flux density that acts on the Hall effect device (70) to cause the Hall effect device (70) to provide a first output signal when the first member is rearward of the predetermined forward position. The magnet (72) creates a magnetic field of a second flux density that acts on the Hall effect device (70) to cause the Hall effect device (70) to provide a second output signal different than the first output signal when the first member is at or forward of the predetermined forward position.

8 Claims, 5 Drawing Sheets

Fig.3

APPARATUS FOR SENSING A FORWARD POSITION OF A VEHICLE SEAT

TECHNICAL FIELD

The present invention relates to an apparatus for sensing a position of a seat in a vehicle.

BACKGROUND OF THE INVENTION

It is often desirable to alter or prevent the actuation of a vehicle occupant protection device, such as an air bag, when a vehicle occupant is positioned close to the protection device. In order to remedy this problem, numerous systems have been developed to detect the position of a vehicle occupant relative to the protection device. Known systems utilize ultrasonic sensors, infrared sensors, microwave sensors or a combination of various sensing devices to detect the position of a vehicle occupant. Other known systems determine the position of a vehicle occupant by detecting the position of the vehicle seat in which the occupant is seated. Such known systems utilize electrical limit switches and a variety of other similar sensing devices.

SUMMARY OF THE INVENTION

An apparatus for sensing a forward position of a vehicle seat comprises a permanent magnet that is located adjacent the forward position of the seat and produces a magnetic field. A Hall effect device is disposed in the magnetic field. A first member is mountable to the vehicle seat and is movable with the seat in a path that extends adjacent the magnetic field to a predetermined forward position adjacent the Hall effect device and the magnet. The first member is made of a ferromagnetic material.

The magnet creates a magnetic field of a first flux density that acts on the Hall effect device to cause the Hall effect device to provide a first output signal when the first member is rearward of the predetermined forward position. The magnet creates a magnetic field of a second flux density that acts on the Hall effect device to cause the Hall effect device to provide a second output signal different than the first output signal when the first member is at or forward of the predetermined forward position.

The Hall effect device is thus switched from a first condition with a first output signal when the vehicle seat is rearward of the predetermined forward position to a second, different condition with a correspondingly different output signal when the seat is at or forward of the predetermined forward position.

BRIEF DESCRIPTION OF THE DRAWINGS

The foregoing and other features of the invention will become more apparent to one skilled in the art upon consideration of the following description of the invention and the accompanying drawings in which.

DESCRIPTION OF A PREFERRED EMBODIMENT

Figure 1:
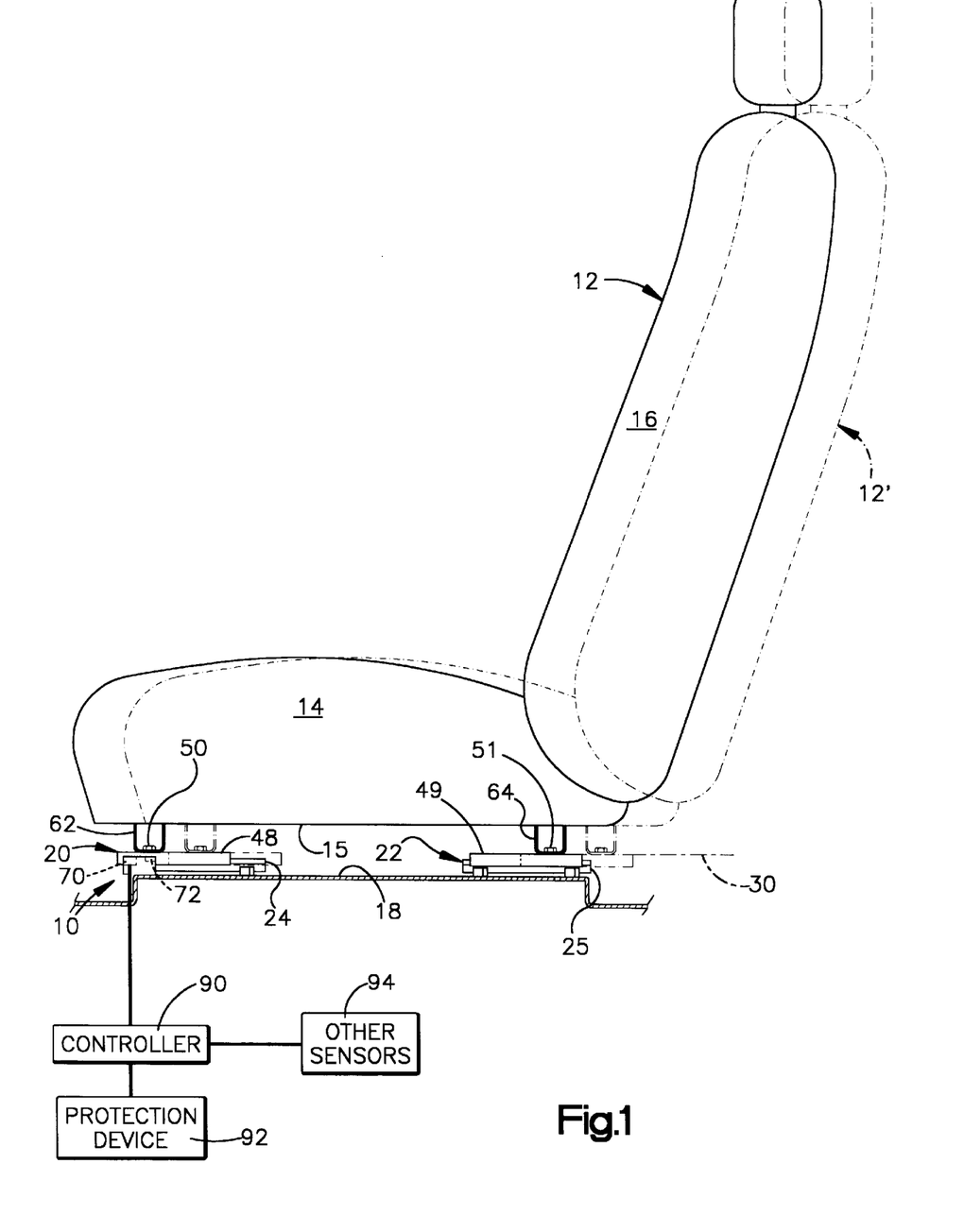
FIG. 1 is a schematic representation of a side elevation of an apparatus for sensing the forward position of a vehicle seat in accordance with a preferred embodiment of the present invention.

FIG. 1 illustrates an apparatus 10 for sensing the forward position of a vehicle seat 12. The seat 12 includes a seat cushion portion 14 and a seat back portion 16 extending upwardly from the seat cushion portion 14. The seat 12 is located within a vehicle occupant compartment and is adjustably (movably) mounted to a lower body portion 18 of a vehicle. The seat 12 is illustrated in solid lines in a forward position, and in dotted lines in a rearward position designated at 12'.

The particular manner in which the seat 12 is moved forward and rearward is not critical to the present invention. The seat may be moved forwardly and rearwardly, for example, by actuating an appropriate electric motor (not shown) operatively coupled to the seat 12 or by manual adjustment after releasing a seat latch by movement of a known mechanical release lever (not shown).

Forward and rearward movement of the vehicle seat 12 is guided by guide tracks, indicated at 20 and 22. While FIG. 1 illustrates a pair of such guide tracks 20 and 22, it will be appreciated that typically there are four such guide tracks near the corner portions of a lower surface 15 of the seat cushion portion 14.

Each guide track 20 and 22 includes a seat bracket, indicated at 24 and 25, respectively, mounted to the lower body portion 18 of the vehicle. The seat brackets 24 and 25 are formed of a suitable rigid material such as steel.

Figure 2:
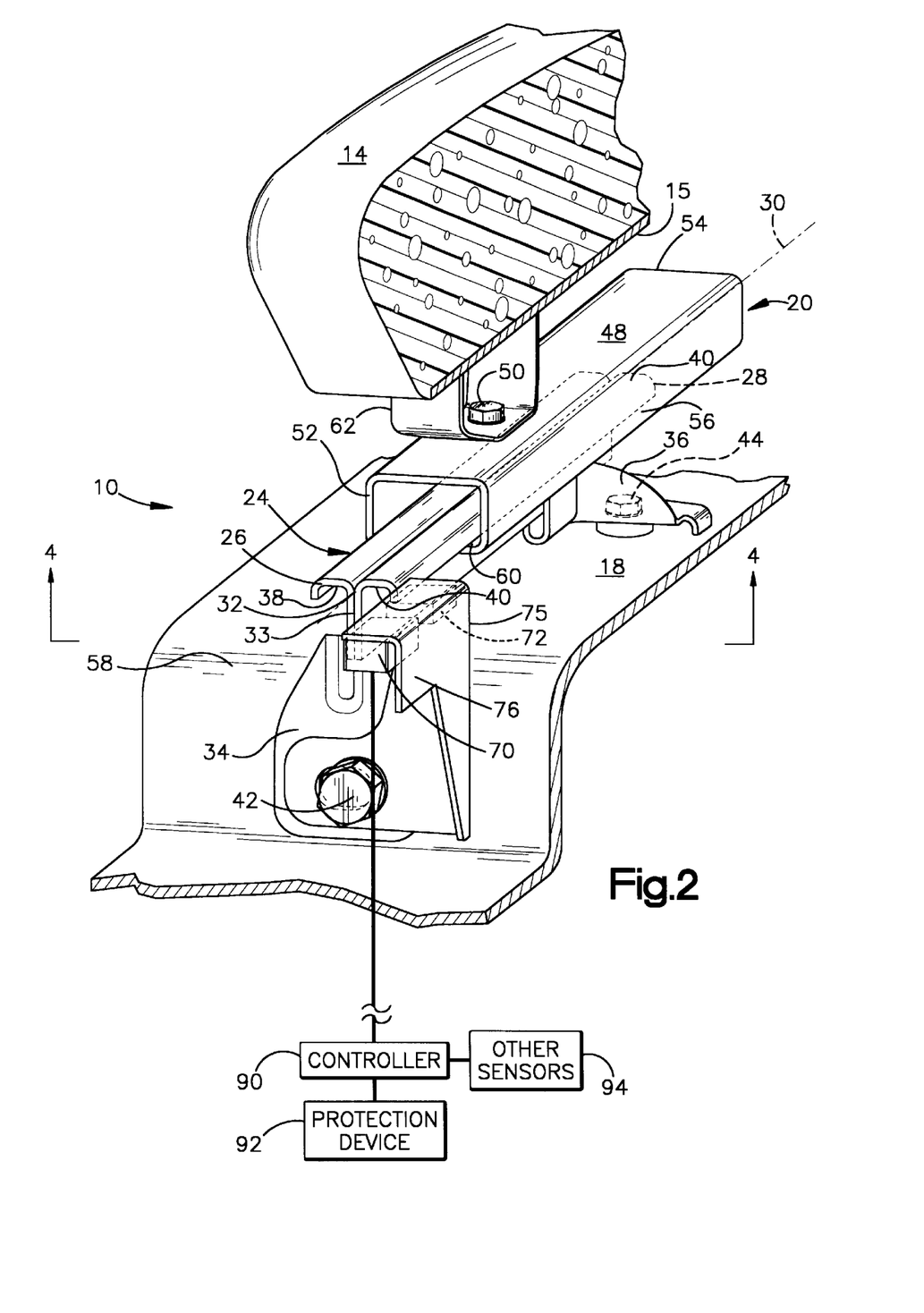
FIG. 2 is an enlarged perspective view of a portion of the apparatus of FIG. 1, illustrating a rearward position of the vehicle seat.
Figure 3:
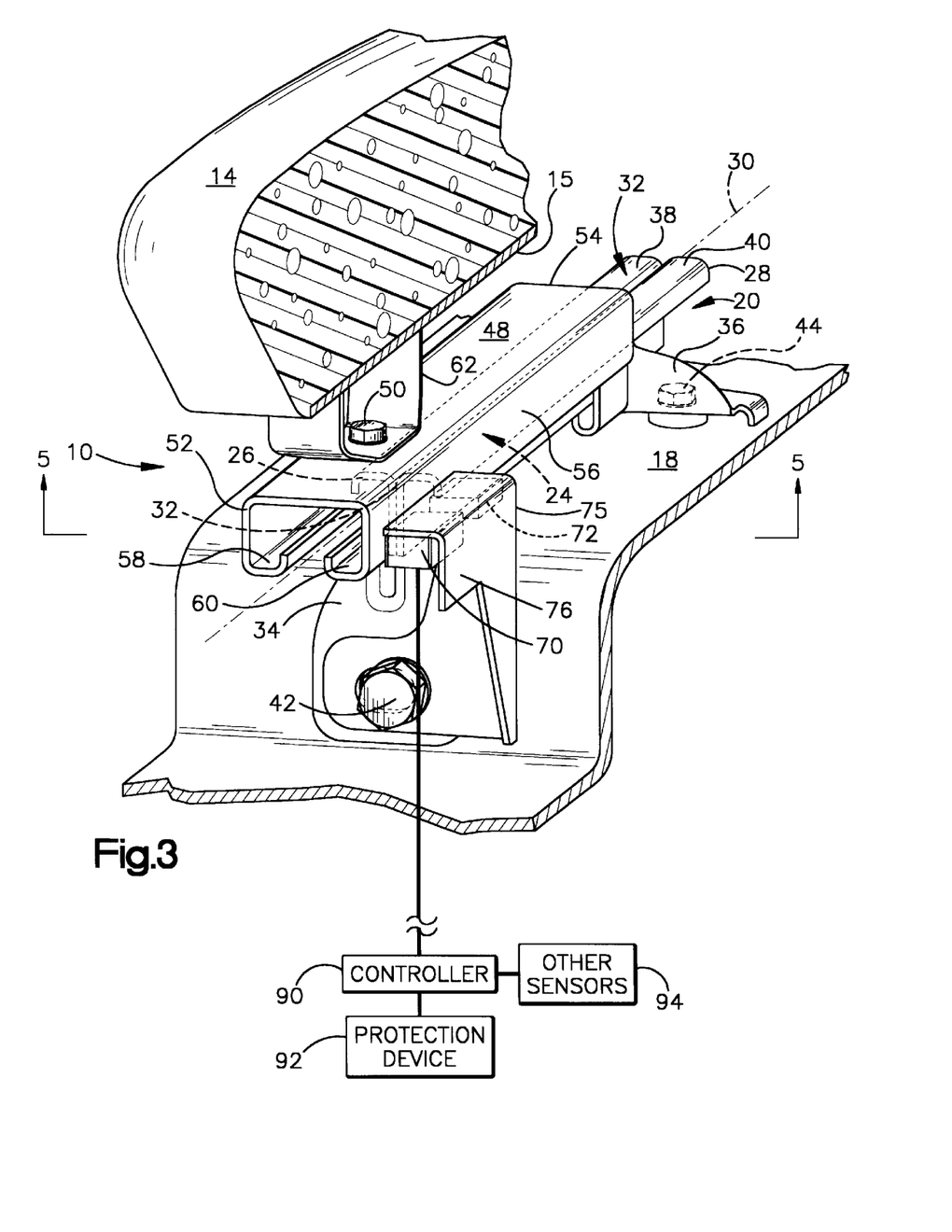
FIG. 3 is a perspective view of the apparatus of FIG. 2, illustrating a forward position of the vehicle seat.

In the embodiment illustrated in FIGS. 2 and 3, the seat bracket 24 of guide track 20 is an elongated T-shaped guide member 32 connected to the lower body portion 18. The guide member 32 includes first and second spaced apart end portions 26 and 28. A longitudinal bracket axis 30 extends through the end portions 26 and 28 of the guide member 32. A vertical base portion 33 of the T-shaped guide member 32 is supported by a pair of spaced apart bracket members 34 and 36. The bracket members 34 and 36 are secured to the lower vehicle body portion 18 by fasteners, illustrated at 42 and 44. The T-shaped member 32 includes laterally extending opposed flanged portions 38 and 40. The flanged portions 38 and 40 extend outwardly transverse to the vertical base portion 33 and curve downwardly towards the lower body portion 18. The flanged portions 38 and 40 form a pair of adjacent, longitudinal channels which extend parallel to the bracket axis 30.

The seat bracket 25 is substantially identical to the seat bracket 24 described above. Alternatively, a single elongated seat bracket (not shown) could be used instead of the pair of the coaxial seat brackets 24 and 25 shown in FIG. 1.

Referring to FIG. 1, the guide tracks 20 and 22 include respective elongated seat rail members 48 and 49 that are mounted to the lower surface 15 of the seat cushion portion 14 by respective fasteners 50 and 51. Each seat rail member 48 and 49 is constructed of a ferromagnetic material, such as steel, and is supported by a respective seat bracket 24 and 25. Each rail member 48 and 49 is also supported by and movable relative to a respective one of the seat brackets 24 and 25 in a direction generally parallel to the bracket axis 30. Thus, the guide tracks 20 and 22 support the seat 12 and allow for forward and rearward movement of the seat 12 in the vehicle.

As shown in FIGS. 2 and 3, the seat rail member 48 has first and second spaced apart end portions 52 and 54, with an elongated body portion 56 extending between the end portions 52 and 54. The body portion 56 has a generally rectangular cross-section and elongated sidewall portions. A pair of opposed upturned flange portions extend longitudinally along a lower sidewall portion of the body portion 56 to define substantially parallel elongated channel portions 58 and 60. The elongated channel portions 58 and 60 receive and slidably engage the respective flanged portions 38 and 40 of the T-shaped guide member 32, which supports the seat 12 for longitudinal movement substantially parallel to the bracket axis 30. Appropriate bearings (not shown) also may be used to support the seat and facilitate the longitudinal movement of the seat rail member 48 relative to the seat bracket 24.

The seat rail member 49 is substantially identical to the rail member 48 described above. Alternatively, a single elongated rail member (not shown) could be used instead of the two spaced apart rail members 48 and 49 shown in FIG. 1.

The seat cushion portion 14 is mounted to and spaced apart from the seat rail member 48 and 49 by respective frame members 62 and 64. The frame members 62 and 64 extend downwardly from the lower surface 15 of the seat cushion portion 14. The frame members 62 and 64 are secured to the upper surface of the rail members 48 and 49 by the fasteners 50 and 51, respectively.

While a preferred embodiment of the guide tracks 20 and 22 has been described, it will be understood and appreciated by those skilled in the art that the apparatus of the present invention may be used with any known type of guide track.

Referring to FIGS. 2 and 3, the bracket member includes a support structure 75. The support structure 75 is attached to the bracket member 34 by the fastener 42. The support structure 75 includes an L-shaped support member 76 that extends from the bracket member 34 in a direction generally parallel to the bracket axis 30. The support structure 75 is positioned adjacent the end portion 26 of the guide member 32, with a portion of the channel 76 extending beyond the axial extent of the first end portion 26 of the guide member 32. In the forward position of FIG. 3, the end portion 52 of the rail member 48 is positioned between the support structure 75 and the guide member 32. In the forward position, the end portion 52 of the rail member 48 is positioned adjacent the support structure 75 and extends along the length of the support member 76.

A Hall effect device 70 is mounted to the support structure 75 portion of the seat bracket 24 on an inside corner of the L-shaped support member 76. A permanent magnet 72 is affixed to the support member 76 next to the Hall effect device 70. The Hall effect device 70 and the magnet 72 may be affixed to the support member 76 in any suitable manner such as by a suitable adhesive. The Hall effect device 70 and the magnet 72 are positioned such that the Hall effect device 70 is within the magnetic field of the magnet 72.

When the vehicle seat 12 is in the rearward position of FIG. 2, the end portion 52 of the rail member 48 is in a position spaced apart from the Hall effect device 70 and the magnet 72. This is best shown in the enlarged view of FIG. 4. In the rearward position, a magnetic field of a first flux density is conducted in a path between north and south poles 80 and 82 of the magnet 72. The path of the magnetic field extends through an air space 84 adjacent the north pole 80 of the magnet 72 and the Hall effect device 70. The path of the magnetic field also extends through the support structure 75. Thus, when the seat 12 is in the rearward position, the magnetic field of the first flux density acts on the hall effect device 70. The magnetic field of the first flux density is indicated generally by the arrows shown in FIG. 4.

Figure 4:
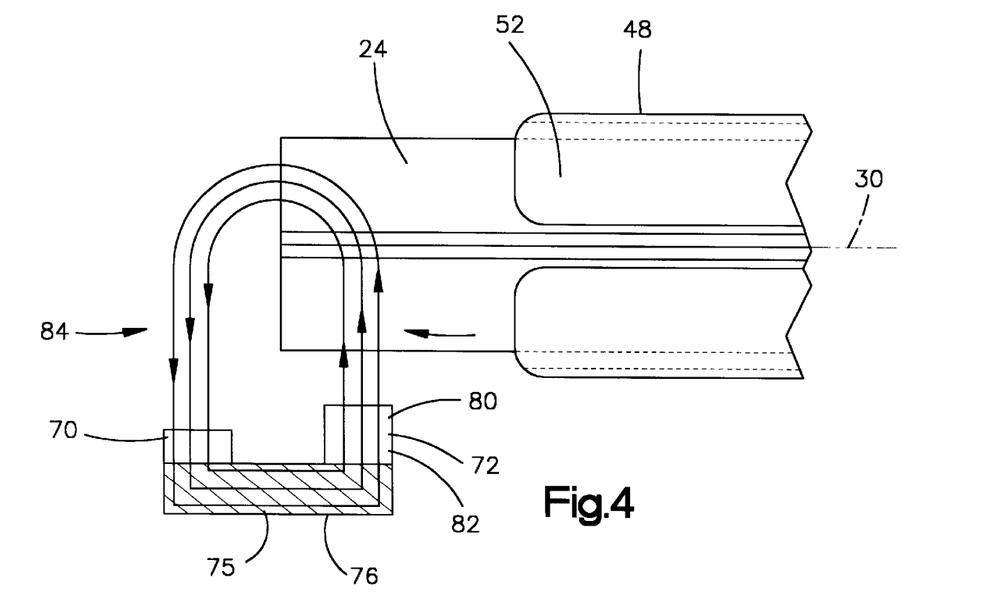
FIG. 4 is an enlarged sectional view of a portion of the apparatus as viewed along line 4—4 in FIG. 2 with certain parts shown schematically.

When the vehicle seat 12 is in the rearward position, the first flux density of the magnetic field of the magnet 72 is relatively low. The low first flux density of the magnetic field can be attributed to the fact that the magnetic field is conducted through the air space 84. As a result, the Hall effect device 70 has a low (or "off") condition with a corresponding low output signal when the vehicle seat 12 is in the rearward position.

As the vehicle seat 12 is adjusted to the forward position of FIG. 3, the end portion 52 of the rail member 48 becomes positioned adjacent the Hall effect device 70 and the magnet 72 when the seat 12 reaches a predetermined forward position. This is best shown in the enlarged view of FIG. 5. As the seat 12 is adjusted forward of the predetermined forward position, a portion of the rail member 48 is positioned adjacent the Hall effect device 70 and the magnet 72. Thus, the rail member 48 is positioned adjacent the Hall effect device 70 and the magnet 72 as the seat 12 is adjusted to any position at or forward of the predetermined forward position.

When the seat 12 is at or forward of the predetermined forward position, the air space 84 is occupied by the rail member 48 and a magnetic field of a second flux density, different than the first flux density, is conducted in a path between the north and south poles 80 and 82 of the magnet 72. The path of the magnetic field extends through the rail member 48 and the support structure 75. Thus, when the seat 12 is at or forward of the predetermined forward position, the magnetic field of the second flux density acts on the hall effect device 70. The magnetic field of the second flux density is indicated generally by the arrows shown in FIG. 5.

Figure 5:
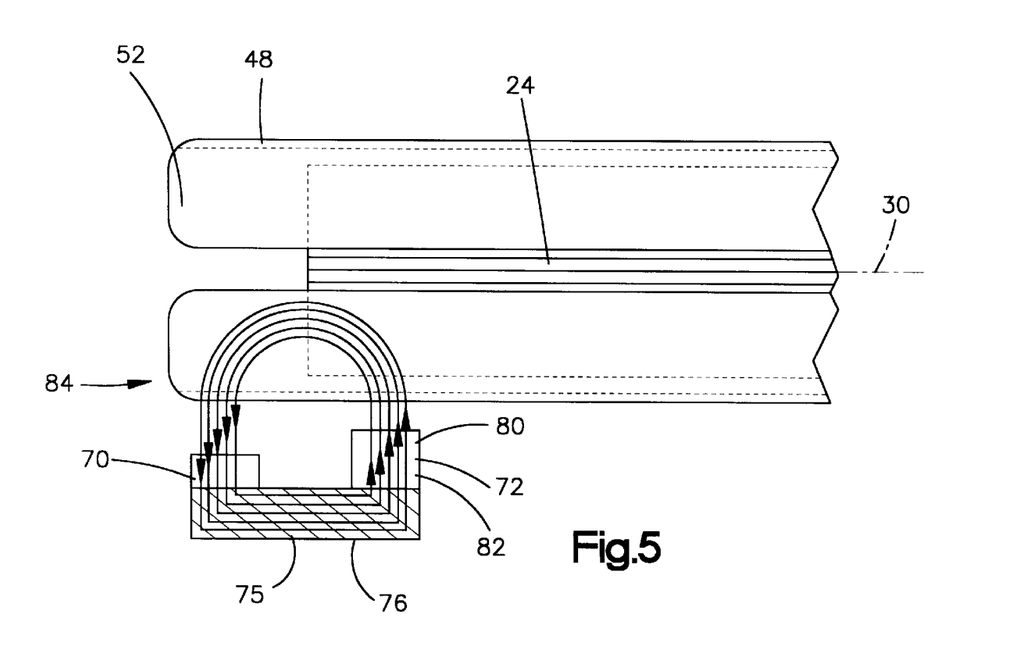
FIG. 5 is an enlarged sectional view of a portion of the apparatus as viewed along line 5—5 in FIG. 3 with certain parts shown schematically.

When the vehicle seat 12 is at or forward of the predetermined forward position, the second flux density of the magnetic field of the magnet 72 is relatively high. Factors that contribute to the high second flux density of the magnetic field include the presence of the ferromagnetic rail member 48 and the minimization of the air space 84. As a result, the Hall effect device 70 has a high (or "on") condition with a corresponding high output signal when the vehicle seat 12 is at or forward of the predetermined forward position.

The Hall effect device 70 is thus switched from a first condition with a first output signal when the vehicle seat 12 is rearward of the predetermined forward position to a second, different condition with a correspondingly different output signal when the seat 12 is at or forward of the predetermined forward position.

The predetermined forward position is determined by the position of the Hall effect device 70 and the magnet 72 relative to the seat rail 48. The predetermined forward position can be adjusted by adjusting the position of the Hall effect device 70 and the magnet 72. For example, it may be desired to detect when the seat 12 is at or within 100 millimeters of its full-forward position. In this instance, the position of the Hall effect device 70 and magnet 72 would be adjusted such that the end portion 52 of the rail member 48 is positioned adjacent the Hall effect device 70 and the magnet 72 when the seat 12 is 100 millimeters from its full-forward position. Thus, the Hall effect device 70 would have a high (or "on") condition with a corresponding high output signal when the vehicle seat 12 is at or within 100 millimeters of its full-forward position.

The rail member 48 is constructed of a ferromagnetic material. However, it may be desirable to incorporate a rail member 48 that is constructed non-ferromagnetic material. In such an instance, a member constructed of a ferromagnetic material could be affixed to the vehicle seat 12, for example via the rail member 48, such that it would move with the vehicle seat 12 and occupy the air space 84 when the vehicle seat 12 is in the forward position. The member would thus conduct the magnetic field of the magnet 72, causing the magnetic field of a second flux density to act upon the Hall effect device 70, as described above.

The information provided by the apparatus 10 can be used to control the operation of a vehicle occupant protection device. Depicted schematically in FIGS. 1–3, the output signal from Hall effect device 70 is directed to a controller 90. The controller 90 may comprise a microcomputer, an integrated circuit, a plurality of discrete components or a combination of integrated circuits and discrete components configured to provide desired functions.

The controller 90 is electrically coupled to an actuatable vehicle occupant protection device 92 for, when actuated, helping to protect a vehicle occupant in a crash event. The protection device 92 suitably is an air bag, such as for a driver or front passenger of the vehicle. Other actuatable vehicle occupant protection devices that can be used in accordance with the present invention include, for example, inflatable knee bolsters, and knee bolsters operated by inflatable air bags. The controller 80 also is coupled to other sensors, schematically indicated at 84. The other sensors 84 may include, for example, a crash sensor, a seat belt buckle switch sensor, a vehicle speed sensor, an occupant weight sensor or any other sensing device or combination of devices which provide useful information concerning actuation of the protection device 92. The other sensors 94 provide signals to the controller 90 indicative of one or more vehicle and occupant conditions.

The controller 90 utilizes the output signal from Hall effect device 70 to control the actuation of the protection device 92. For example, where the output signal of the Hall effect device 70 indicates that the seat 12 is at or forward of the predetermined forward position, the controller 90 may control actuation of the occupant protection device 92 so that its inflation is somewhat delayed. Under appropriate circumstances, the output signal of the Hall effect device 70 also might be used by the controller 90, in combination with the signals from the other sensors 94, to delay or even prevent actuation of the protection device 92.

Figure 6:
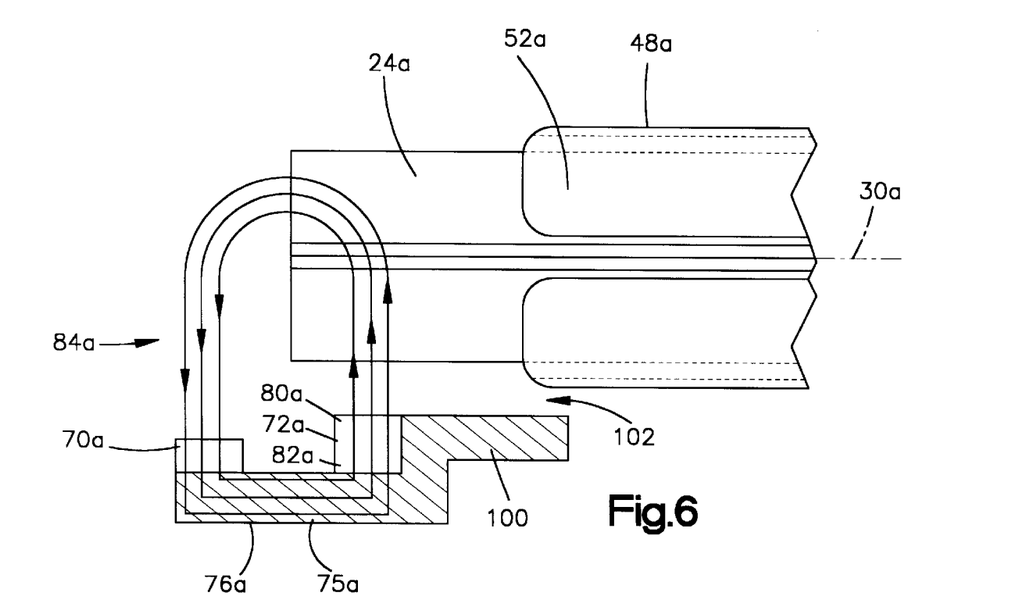
FIG. 6 is an enlarged sectional view of a portion of the apparatus, according to a second embodiment of the invention, depicting a rearward position with certain parts shown schematically.
Figure 7:
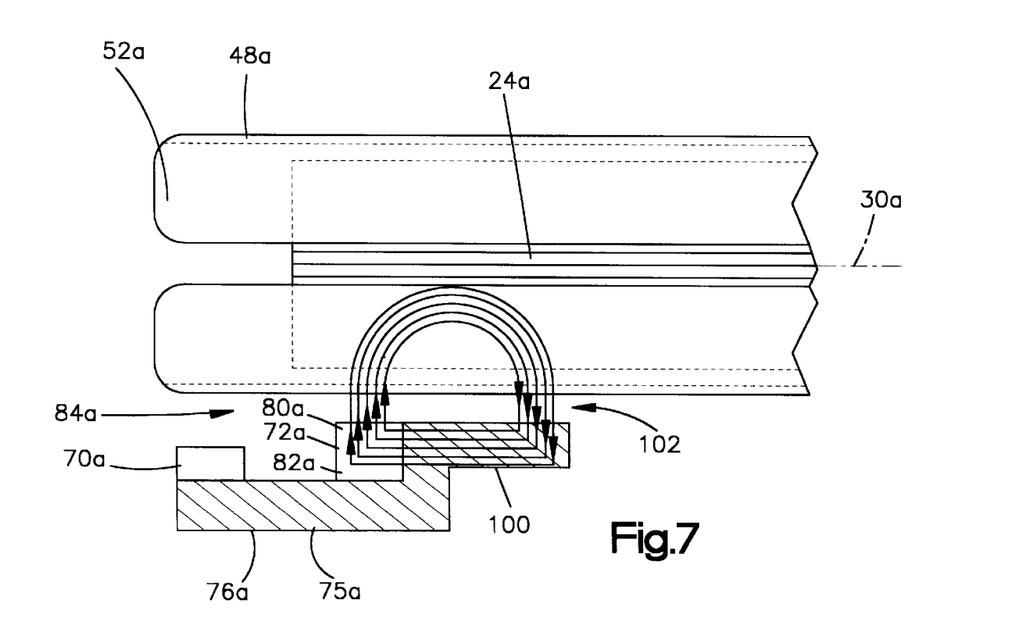
FIG. 7 is an enlarged sectional view of a portion of the apparatus of FIG. 6 depicting a forward position with certain parts shown schematically.

A second embodiment of the present invention similar in construction and operation to the first embodiment is illustrated in FIGS. 6 and 7. Since the second embodiment of the invention is similar to the first embodiment of the invention illustrated in FIGS. 1–5, numerals similar to those of FIGS. 1–5 will be utilized in FIGS. 6 and 7 to identify similar components, the suffix letter "a" being associated with the numerals of FIGS. 6 and 7 to avoid confusion.

In the second embodiment, the support structure 75*a* includes a collector flange 100 positioned adjacent the magnet 72*a* and extending parallel to the bracket axis 30*a*.

The collector flange 100 is constructed of a ferromagnetic material. An air gap 102 is formed between the collector flange 100 and the seat bracket 24*a*. As the seat rail member 48*a* moves from the rearward position of FIG. 6 toward the forward position of FIG. 7, the rail member 48*a* becomes positioned in the air gap 102 adjacent the magnet 72*a* and the collector flange 100.

When the vehicle seat (not shown in FIGS. 6 and 7) is in the rearward position of FIG. 6, the end portion 52*a* of the rail member 48*a* is in a position spaced apart from the Hall effect device 70*a*, magnet 72*a*, and collector flange 100. In the rearward position, a magnetic field of a first flux density is conducted in a path between north and south poles 80*a* and 82*a* of the magnet 72*a*. The path of the magnetic field extends through the air space 84*a* and through the support member 76*a*. Thus, when the seat is in the rearward position, the magnetic field of a first flux density acts on the Hall effect device 70*a*. The magnetic field of the first flux density is indicated generally by the arrows shown in FIG. 6. As a result, the Hall effect device 70*a* has a high (or "on") condition with a corresponding high output signal when the vehicle seat is in the rearward position.

As the vehicle seat is adjusted to the forward position of FIG. 7, the end portion 52*a* of the rail member 48*a* becomes positioned adjacent the collector flange 100 and the magnet 72*a* when the seat reaches a predetermined forward position. As the seat is adjusted forward of the predetermined forward position, a portion of the rail member 48*a* is positioned adjacent the collector flange 100 and the magnet 72*a*. The rail member 48*a* is positioned adjacent the collector flange 100 and the magnet 72*a* as the seat is adjusted to any position at or forward of the predetermined forward position.

When the seat 12 is at or forward of the predetermined forward position, the air gap 102 is occupied by the rail member 48*a*. The ferromagnetic masses of the rail member 48*a* and the collector flange 100 are positioned in close proximity to the magnet 72*a*. The rail member 48*a* and the collector flange 100 thus define a path for conducting magnetic flux between the north and south poles 80*a* and 82*a* of the magnet 72*a*. This magnetic field is indicated generally by the arrows in FIG. 7.

In the forward position of FIG. 7, little or no magnetic flux acts on the Hall effect device 70*a*. This magnetic field of a second flux density, which may be zero, acts on the Hall effect device 70*a* when the seat is at or forward the predetermined forward position. As a result, the Hall effect device 70*a* has a low (or "off") condition with a corresponding low output signal when the vehicle seat is at or forward of the predetermined forward position.

The Hall effect device 70*a* is thus switched from a first condition with a first output signal when the vehicle seat is rearward of the predetermined forward position to a second, different condition with a correspondingly different output signal when the seat is at or forward of the predetermined forward position.

The predetermined forward position is determined by the position of the Hall effect device 70*a*, magnet 72*a*, and collector flange 100 relative to the seat rail 48*a*. The predetermined forward position can be adjusted by adjusting the position of the Hall effect device 70*a*, magnet 72*a*, and collector flange 100. For example, it may be desired to detect when the seat is at or within 100 millimeters of its full-forward position. In this instance, the position of the Hall effect device 70*a*, magnet 72*a*, and collector flange 100 would be adjusted such that the end portion 52*a* of the rail member 48a is positioned adjacent the magnet 72a and collector flange 100 when the seat is 100 millimeters from its full-forward position. Thus, the Hall effect device 70a would have a low (or "off") condition with a corresponding low output signal when the vehicle seat is at or within 100 millimeters of its full-forward position.

In the second embodiment, the rail member 48a is constructed of a ferromagnetic material. However, it may be desirable to incorporate a rail member 48a that is constructed of a non-ferromagnetic material. In such an instance, a member constructed of a ferromagnetic material could be affixed to the vehicle seat, for example via the rail member 48a, such that it would move with the vehicle seat and occupy the air gap 84a when the vehicle seat is in the forward position. The member, in combination with the collector flange 100, would thus conduct the magnetic field of the magnet 72a, causing the magnetic field of a second flux density to act upon the Hall effect device 70a, as described above.

From the above description of the invention, those skilled in the art will perceive improvements, changes and modifications. Such improvements, changes and modifications within the skill of the art are intended to be covered by the appended claims.

What is claimed is:

1. An apparatus for sensing a forward position of a vehicle seat in a vehicle, said apparatus comprising:

a permanent magnet located adjacent said forward position, said permanent magnet producing a magnetic field;

a Hall effect device disposed in said magnetic field; and a first member mountable to the vehicle seat and movable with the vehicle seat, said first member being movable in a path which extends through said magnetic field to a predetermined forward position adjacent said Hall effect device and said permanent magnet, said first member being made of a ferromagnetic material;

said permanent magnet creating a magnetic field of a first flux density acting on said Hall effect device to cause said Hall effect device to provide a first output signal when said first member is rearward of said predetermined forward position;

said permanent magnet creating a magnetic field of a second flux density acting on said Hall effect device to cause said Hall effect device to provide a second output signal different than said first output signal when said first member is at or forward of said predetermined forward position.

2. Apparatus as defined in claim 1 wherein said first member conducts said magnetic field of said second flux density.

3. Apparatus as defined in claim 2 further including an actuatable vehicle occupant protection device for, when actuated, helping to protect a vehicle occupant, and a controller for controlling actuation of said vehicle occupant protection device in response to said first and second output signals from said Hall effect device.

4. Apparatus as defined in claim 3 wherein said controller delays actuation of said vehicle occupant protection device in response to said second output signal of said Hall effect device when said vehicle seat is at or forward of said predetermined forward position.

5. Apparatus as defined in claim 2 further comprising:

a seat bracket mounted to a lower portion of said vehicle, said seat bracket having spaced apart end portions and an axis extending through said end portions; and an elongated seat rail mounted to said vehicle seat and positioned parallel to said axis, said seat rail engagable with said seat bracket and movable with said vehicle seat relative to said seat bracket along said axis;

said Hall effect device and said permanent magnet being supported on said seat bracket adjacent said predetermined forward position.

6. Apparatus as defined in claim 5 wherein said first member is supported on said seat rail.

7. Apparatus as defined in claim 5 wherein said first member comprises a portion of said seat rail.

8. Apparatus as defined in claim 1 wherein said second flux density is zero.

* * * * *

UNITED STATES PATENT AND TRADEMARK OFFICE
CERTIFICATE OF CORRECTION

PATENT NO. : 6,095,555
DATED : August 1, 2000
INVENTOR(S) : David L. Becker and LaVerne R. Newman It is certified that error appears in the above-indentified patent and that said Letters Patent is hereby corrected as shown below:

item [75],
Front Page, Inventors, change "laverne" to "LaVerne"

Signed and Sealed this

First Day of May, 2001

Attest:

NICHOLAS P. GODICI

Attesting Officer     Acting Director of the United States Patent and Trademark Office